Sept. 12, 1950     I. JEPSON     2,522,372

COFFEE MAKER SEAL

Filed July 10, 1946

INVENTOR.

Ivar Jepson

BY McKenna & Morsbach

ATTORNEYS

Patented Sept. 12, 1950

2,522,372

UNITED STATES PATENT OFFICE 2,522,372

COFFEE MAKER SEAL

Ivar Jepson, Oak Park, Ill., assignor to Sunbeam Corporation, Chicago, Ill., a corporation of Illinois Application July 10, 1946, Serial No. 682,709

4 Claims. (Cl. 99—292)

This invention relates to improvements in the kind of coffee maker commonly known as the vacuum type and in which water is heated in a lower container and transferred to an upper container for contact with the ground coffee, whereupon it is returned to the first container. This application has specific reference to the connection or seal between the upper and lower containers.

One object of my invention is the provision of a pressure sealable gasket construction wherein steam pressure generated within the lower container is operative to hold the two containers tightly together.

Another object of my invention lies in the provision of an improved gasketed connection for the upper and lower containers of a coffee maker in which the upper container may be easily mounted on and removed from the lower container before and after the coffee making cycle, but which is tightly held thereon by steam pressure during the cycle. My improved construction avoids the disadvantages of prior coffee makers in which the pressure tended to loosen and dislodge the upper container, thereby disturbing the cycle and producing a poor quality of coffee. Certain prior coffee maker constructions have avoided the difficulty of loosening under pressure by holding the two containers together with a screwed member but such constructions have entailed an objectionable expense now obviated by my invention.

Another object of my invention is to eliminate the usual wrenching forces necessary to assemble and disassemble the conventional coffee makers of this type and to provide a seal which works with the steam pressure in the lower pot instead of against it, whereby the two containers will be held together with increasing forces at increasing steam pressures.

Other objects and advantages will appear from the following description and the accompanying drawings in which—

Figure 1:
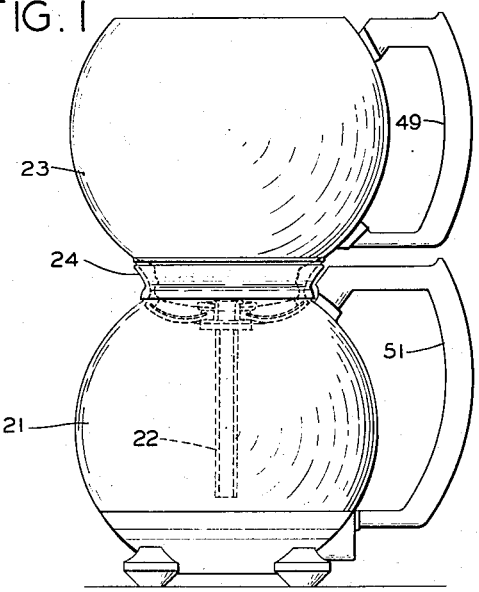
Figure 1 is a side view of a coffee maker embodying one construction of the invention.
Figure 2:
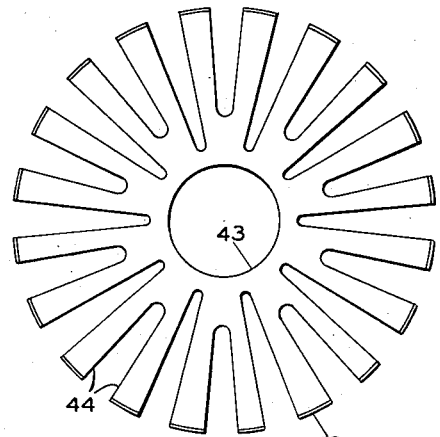
Fig. 2 is a view of one form of gasket-wrenching spring member employed with my invention.

Referring to Figure 1, the coffee maker shown is one known as the vacuum type, which operates by displacement of hot water from the container or pot 21 through the tube 22 into the upper container or bowl 23 which contains the coffee grind. After the hot water is effective to leach out the grind the coffee liquid is caused to return to the pot 21 by the lowering of the temperature therein.

In the embodiment here shown for purposes of illustration the pot 21 may be heated in any preferred manner, as by placing it over a hot plate or it may have included in it an automatic electric heating unit, such as that disclosed in Patent 2,312,555, issued to me, on March 2, 1943. The particular means chosen for heating will be immaterial inasmuch as it forms no part of the present invention which is confined to the improved means for sealing the bowl-pot connection.

Figure 3:
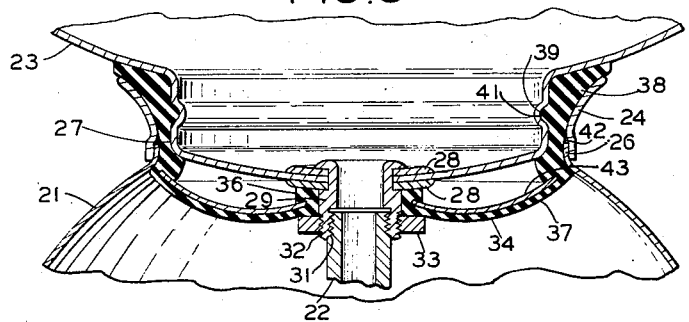
Fig. 3 is a fragmentary enlarged sectional view of Figure 1 showing a pressure sealing gasketed connection between the upper and lower containers.
Figure 4:
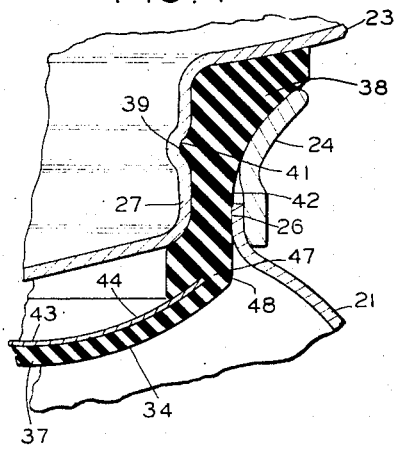
Fig. 4 is an enlarged partial view of a portion of Fig. 3 showing the parts in their normal or non-expanded positions.
Figure 5:
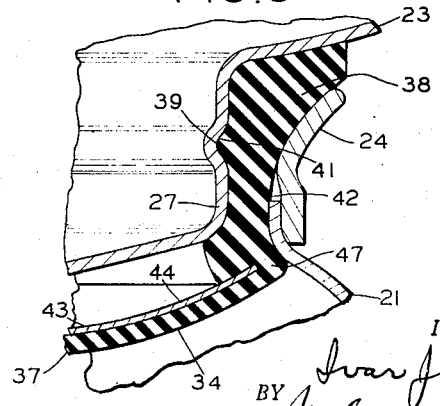
Fig. 5 is a view similar to Fig. 4 showing the parts after the gasket has been expanded into engagement with the lower container by steam pressure therein.

Referring now more particularly to the elements of construction making up the present invention the upper part of the pot 21 is formed with an outwardly flared rim or throat portion 24 which may be a separate piece spun or soldered on, as shown, or it may be an integral part of the pot. The throat 24 will taper inwardly to a constricted portion 26 of minimum dimension and then outwardly again into the main body of the pot. The bowl 23 will be provided with a cup-shaped depending portion 27 of somewhat smaller diameter than the constriction 26. At the center, the cup-shaped portion 27 will be strengthened by annular disks 28 to which is attached the depending bushing or hollow spud 29 which is threaded interiorly and exteriorly at 31 and 32 for engagement, respectively, with the transfer tube 22 and the nut 33. A gasket member of rubber or rubber-like material, generally designated 34, will have an interior apertured portion 36 gripped between the nut 33 and one of the plates 28, an annular diaphragm portion 37, and an outer peripheral sealing portion 38 formed to fit the contour of the throat 24 above the constriction 26 and also to fit the outer periphery of the bowl depending portion 27. The latter is formed with a groove 39 in its outer surface for engagement with an inwardly extending bead 41 on the gasekt so that when the bowl 23 is lifted from the pot 21 the sealing surface 42 of the gasket will come cleanly away with the bowl. As shown in Fig. 4, the lower part of the gasket peripheral portion 38 below the throat constriction at 26 will normally be the same diameter or only slightly greater than the constriction 26 whereby the two containers may be assembled with a light press fit instead of the forceful wrenching action required with conventional coffee maker gaskets. A downwardly convex annular shaped metallic spring member 43 having the radially extending fingers 44 is positioned to support the gasket diaphragm portion 37 and has its inner periphery edge gripped within the gasket portion 36 by the nut 33 so that it too forms a part of the upper container 23. In the particular modification shown, it is a separable part but may conveniently be incorporated as an integral part of the molded gasket member. In either case it will serve the function of coacting with the diaphragm portion to back it up and strengthen it. It will be seen that the gasket sealing portion 38 extends beneath the constricted throat portion 26 and that the finger tips 46 engage the gasket sealing portion at this position so that when the diaphragm and spring are distorted upwardly by steam pressure within the pot they will approach a flatter configuration and the finger tips will be deflected radially outwardly to expand the lower sealing portion 47 of the gasket beyond the diameter of the throat constriction and into engagement with the inwardly flared portion of the pot body wall, as shown in Figs. 3 and 5.

In operation, the coffee grind will be placed in the bowl 23 and water in the pot 21. Heat from a suitable source will be applied to the bottom of the pot. As the water is heated to produce steam or vapor pressure, hot water will be forced upward in the tube 22 through a filter cloth (not shown) and into the bowl 23 until it is substantially all displaced from the pot into the bowl. As the pressure builds up within the pot to effect the above displacement, this pressure will deflect the gasket diaphragm portion 37 and the back-up disk spring member 43 upward from the normally-convex configuration shown in Fig. 4 to the less-convex configuration shown in Fig. 5 to press the lower sealing portion 47 of the gasket outward, beneath and beyond the throat constriction 26, into engagement with the body wall of the pot 21. Upon release of the pressure in the pot 21 by the lowering of its temperature in the conventional manner the coffee solution in the bowl 23 will run downwardly through the filter assembly (not shown) through the tube 22 to the pot, the grounds being filtered out by the filter cloth.

When the pressure within the pot 21 has been reduced to effect the return of liquid thereto, the resilience of the spring member 43 will cause the lower portion 47 of the gasket to be drawn back to the position shown in Fig. 4 where its outer surface 48 is once more at the same or only slightly greater than the dimension of the throat constriction 26, whereby the bowl may be removed from the pot by the application of a fairly light force to the handles 49 and 51.

With this construction the pressure in the pot 21 is made to work with the gasket instead of against it as in conventional constructions. The higher the pressure the tighter the seal, yet, the force necessary to assemble or disassemble the two containers is far less than that required for the old unimproved coffee makers, because the lower outside surface 48 of the gasket can be made the same size or only slightly larger than the throat constriction 26. This, of course, is contrasted with previous constructions in which the gasket had to be made considerably larger than its mating surface in the pot so that the parts could be wrenched together with a torque sufficiently high to assure that the steam pressure would not later force the containers apart. This conventional method presented the added disadvantage that the containers were sometimes very difficult to take apart.

While a particular form of the present invention has been shown, it will be apparent that minor changes therein will readily suggest themselves to others skilled in the art without departing from the spirit and scope of the invention. Having thus described the invention, what is claimed as new is:

1. In a vacuum type coffee maker wherein the lower vessel has a throat opening of relatively large diameter and the upper vessel has a bottom portion adapted to be located in said throat opening when in operative position, an annular gasket of resilient material adapted to establish a seal between the inner wall of said throat opening and the outer wall of said bottom portion, the gasket having a lower portion extending into the lower vessel beneath said throat opening and adapted to be radially expanded outwardly into holding engagement with the inner wall of the lower vessel beneath said throat opening, and a diaphragm coacting with said lower gasket portion and responsive to increase in internal pressure within the lower vessel to effect said radial expansion of said lower portion of the gasket.

2. In a coffee maker of the vacuum type, a lower vessel having a throat opening of relatively large diameter, an upper vessel having a depending portion adapted to enter the throat of the lower vessel, an annular rubber gasket seated on the peripheral wall of said depending portion, the gasket having an annular portion extending beneath said depending portion and merging into a diaphragm which is connected at its center to the lower portion of the upper vessel, said diaphragm being normally arched downwardly from said peripheral wall portion and said center connection whereby the diaphragm is responsive to increase in internal pressure within the lower vessel to expand said lower portion of the gasket into holding engagement with the inner wall of the lower vessel.

3. In a coffee maker of the vacuum type, a lower vessel having a throat opening of relatively large diameter, an upper vessel having a depending portion adapted to enter the throat of the lower vessel, an annular rubber gasket seated on the peripheral wall of said depending portion, the gasket having an annular portion normally extending beneath said depending portion into an enlarged portion of said lower vessel beneath said throat and merging into a diaphragm which is connected at its center to the lower portion of the upper vessel, said diaphragm being normally arched downwardly from said peripheral wall portion and said center connection whereby the diaphragm is responsive to increase in internal pressure within the lower vessel to expand said lower portion of the gasket into holding engagement with the enlarged portion of said lower vessel beneath said throat, and resilient spring means coacting with said arched portion of the diaphragm tending to maintain it in said normal position.

4. In a vacuum type coffee maker wherein the lower vessel has a throat opening of relatively large diameter and the upper vessel has a bottom portion adapted to be located in said throat opening when in operative position, an annular gasket of resilient material adapted to establish a seal between the inner wall of said throat opening and the outer wall of said bottom portion, the gasket having a lower portion extending into the lower vessel beneath said throat opening and adapted to be expanded outwardly into holding engagement with the inner wall of the lower vessel beneath said throat opening, and means responsive to increase in internal pressure within the lower vessel to effect said expansion of said lower portion of the gasket, said pressure responsive means including a resilient diaphragm connected at its inner portion to the lower portion of the upper vessel and at its outer peripheral portion to said expansible portion of the gasket, and a resilient metallic disk coacting with the diaphragm and responsive to the increase in internal pressure to apply outward pressure against said lower portion of the gasket to effect said holding engagement.

IVAR JEPSON.

REFERENCES CITED

The following references are of record in the file of this patent:

UNITED STATES PATENTS

| Number | Name | Date |
|---|---|---|
| 859,733 | Bot | July 9, 1907 |
| 2,001,458 | Dunn | May 14, 1935 |
| 2,053,451 | Umstott | Sept. 8, 1936 |
| 2,093,316 | Fowler | Sept. 14, 1937 |
| 2,223,450 | Jepson et al. | Dec. 3, 1940 |
| 2,321,411 | Morse | June 8, 1943 |
| 2,366,951 | Aycock | Jan. 9, 1945 |